(12) United States Patent
Fang

(10) Patent No.: US 6,785,141 B2
(45) Date of Patent: Aug. 31, 2004

(54) LOCKING AND EJECTING DEVICE FOR REMOVABLE MODULE IN A PORTABLE COMPUTER

(75) Inventor: Ming-Hsiung Fang, Taipei (TW)

(73) Assignee: Quanta Computer, Inc., Taoyuan (TW)

( * ) Notice: Subject to any disclaimer, the term of this patent is extended or adjusted under 35 U.S.C. 154(b) by 33 days.

(21) Appl. No.: 10/263,189

(22) Filed: Oct. 3, 2002

(65) Prior Publication Data

US 2004/0066632 A1 Apr. 8, 2004

(51) Int. Cl.[7] ............................................. H05K 7/02
(52) U.S. Cl. .................. 361/727; 439/928.1; 312/223.2
(58) Field of Search ................... 361/721–732, 361/724–727; 439/152, 153, 159, 160, 928, 928.1, 267; 312/223.1, 223.2

(56) References Cited

U.S. PATENT DOCUMENTS

| | | | | | |
|---|---|---|---|---|---|
| 5,179,505 A | * | 1/1993 | Matsuo | ........................ | 361/754 |
| 5,507,658 A | * | 4/1996 | Ho | ............................. | 439/159 |
| 5,967,810 A | * | 10/1999 | Spickler et al. | ............. | 439/159 |
| 6,155,853 A | * | 12/2000 | Kajiura | ........................ | 439/159 |
| 6,319,028 B1 | * | 11/2001 | Zhang et al. | ................ | 439/159 |
| 6,439,903 B1 | * | 8/2002 | Burkart | ....................... | 439/159 |
| 6,482,020 B1 | * | 11/2002 | Yeh | .............................. | 439/159 |
| 6,554,627 B1 | * | 4/2003 | Chen | ........................... | 439/159 |
| 6,587,350 B1 | * | 7/2003 | Lin et al. | ..................... | 361/754 |

* cited by examiner

*Primary Examiner*—Dean A. Reichard
*Assistant Examiner*—Carmelo Oliva
(74) *Attorney, Agent, or Firm*—Birch, Stewart, Kolasch & Birch, LLP

(57) ABSTRACT

A locking and ejecting device for removable module in a portable computer, wherein the removable module is insertable into and removable from an internal bay of the portable computer. The locking and ejecting device includes a latch mechanism, a hot-plug controller, and a remove mechanism. The latch mechanism coupled to the internal bay is for locking the removable module in an assembled position. The hot-plug controller formed on the latch mechanism is for switching off a power unit before removing the removable module. The remove mechanism coupled to the internal bay is for removing the removable module from the assembled position to a disassembled position after the latch mechanism unlocks the removable module.

16 Claims, 6 Drawing Sheets

LOCKING AND EJECTING DEVICE FOR REMOVABLE MODULE IN A PORTABLE COMPUTER

BACKGROUND OF THE INVENTION

1. Field of the Invention

The invention relates in general to a locking and ejecting device, and more particularly to a locking and ejecting device for a removable module in a portable computer.

2. Description of the Related Art

Portable computers have come into general use with the advances in electronics technology in recent years. They are commonly called notebook or subnotebook computers, which are small enough to carry. As portable computers have increased in sophistication and decreased in size, efforts have been made to increase the amount of stored data and the number of peripheral devices. One technique for more space-efficiently containing electronic modules is to supply an internal bay within the portable computer. The electronic modules can be installed for usage by the portable computer system, and then removed, allowing for connection of other electronic modules.

Referring to FIG. 1, a schematic view of removable modules for a portable computer is shown. In order to provide greater flexibility in the operation of a portable computer system, it is often desirable to incorporate several removable modules 12 into the system by supplying an internal bay 100 within the portable computer 10. The internal bay 100 can flexibly receive different removable modules 12, such as a media module 120, a floppy disk drive 122, a CD ROM drive 124, an extra battery 126, and a hard disk drive 128. Further, many applications permit the removable module to be interchanged for reasons of data security, backup purposes or for expanding a system.

Since space in a portable computer is at a premium, little space is available for the mechanisms for retaining and ejecting the removable modules. Consequently, what is needed for removable design is reliable installation and easy and safe removal of the removable module under space and height constraints. Furthermore, simple structure of removable design is beneficial for the mass production and assembling and prevents the removable module from getting stuck during the installation or removal of the removable module.

SUMMARY OF THE INVENTION

It is therefore an object of the invention to provide a locking and ejecting device for a removable module in a portable computer. The simple structure of the locking and ejecting device can secure the removable module for usage and easily remove the removable module for interchange. Besides, it is provided with the hot-plug function to avoid unsafe removal of the removable module.

The invention achieves the above-identified objects by providing a locking and ejecting device for a removable module in a portable computer having an internal bay, wherein the removable module is insertable into and removable from the internal bay of the portable computer. The locking and ejecting device includes a latch mechanism, a hot-plug controller, and a remove mechanism. The latch mechanism coupled to the internal bay is for locking the removable module in an assembled position. The hot-plug controller formed on the latch mechanism is for switching off a power unit before removing the removable module. The remove mechanism coupled to the internal bay is for or removing the removable module from the assembled position to disassembled position after the latch mechanism unlocks the removable module.

Other objects, features, and advantages of the invention will become apparent from the following detailed description of the preferred but non-limiting embodiments. The following description is made with reference to the accompanying drawings.

DETAILED DESCRIPTION OF THE INVENTION

The locking and ejecting device for a removable module in a portable computer according to the invention is used for incorporating removable modules of different types into the portable computer system. The removable module can be a media module, a floppy disk drive, a CD ROM drive, an extra battery, or a hard disk drive, which is insertable into and removable from an internal bay of the portable computer. The locking and ejecting device is applied to a portable computer, mainly including a latch mechanism and a remove mechanism. The latch mechanism and the remove mechanism are respectively coupled to the internal bay. The latch mechanism is for locking the removable module in an assembled position. The remove mechanism is for removing the removable module from the assembled position to a disassembled position after the latch mechanism unlocks the removable module.

Figure 1:
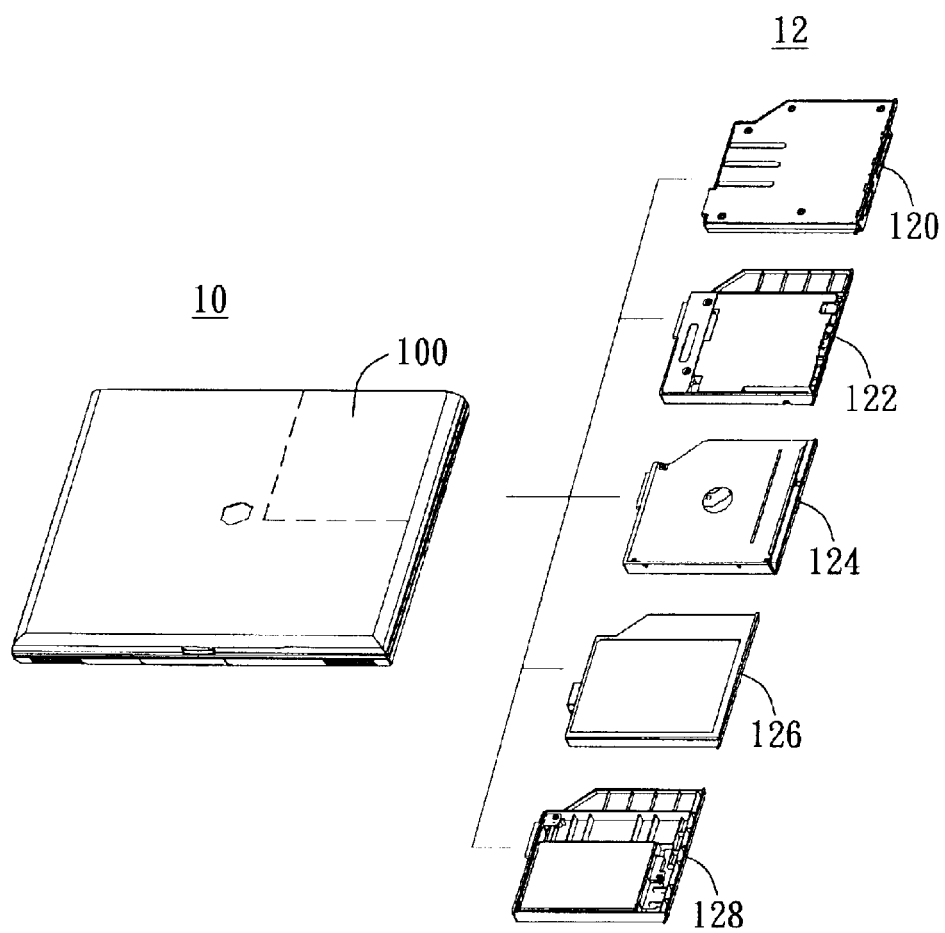
FIG. 1 (Prior Art) is a schematic view showing removable modules for a portable computer.
Figure 2:
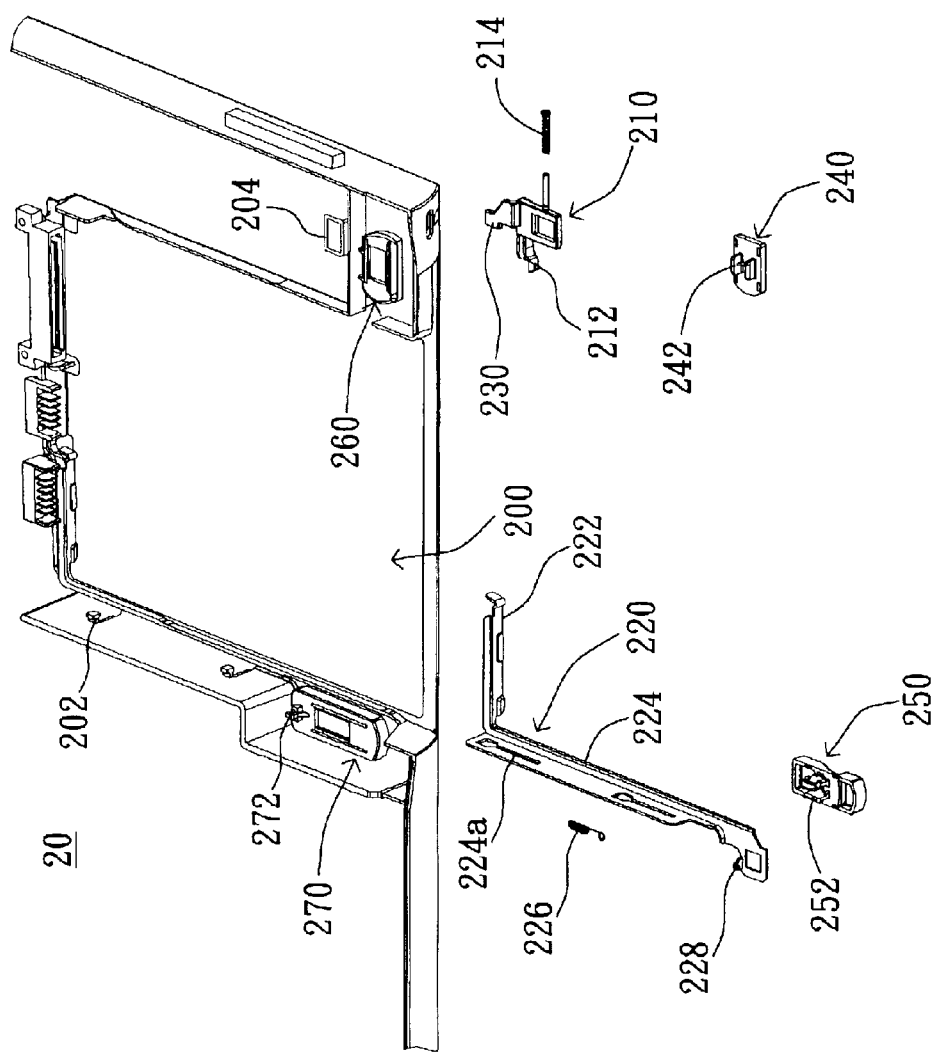
FIG. 2 is an exploded view of the locking and ejecting device for a removable module in a portable computer according to a preferred embodiment of the invention.

Referring to FIG. 2, an exploded view of the locking and ejecting device for a removable module in a portable computer according to a preferred embodiment of the invention is shown. The locking and ejecting device includes a latch mechanism 210, a remove mechanism 220, a hot-plug controller 230, a first knob 240, and a second knob 250. The latch mechanism includes a latch bolt 210, a compression spring 214. The hot-plug controller 230 is formed on the latch mechanism 210 and is used for controlling the power unit 204. The remove mechanism 220 is an L-shaped component for holding the removable module, including a push rod 222, a push arm 224, and an extension spring 226. The push arm 224 is perpendicular to the push rod 222. As shown in FIG. 2, the push arm 224 has sliding tracks 224a so that the supports 202 formed on the internal bay 200 relatively slide in the sliding tracks 224a. In another way, the supports can be formed on the push arm 224 and slide in a sliding tracks formed on the internal bay 200.

In addition, the locking and ejecting device includes a first knob 240 and a second knob 250. The first knob 240 is placed under the first tunnel 260 and has a first protrusion 242 projecting upward to engage with the latch mechanism 210. The second knob 250 is placed under the second tunnel 270 and has a second protrusion 252 projecting upward to engage with the remove mechanism 220.

Figure 3:
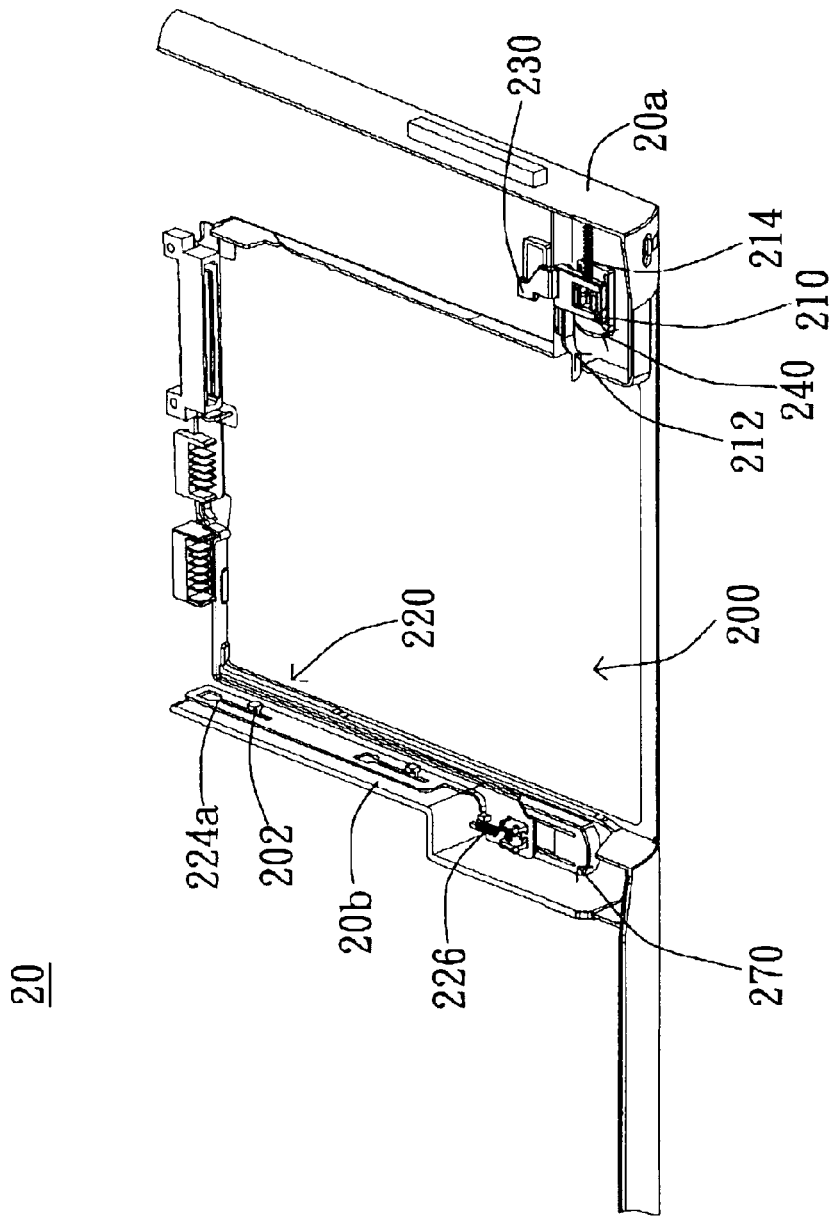
FIG. 3 is a structural view of the locking and ejecting device for a removable module in a portable computer according to a preferred embodiment of the invention.

Referring to FIG. 3, a structural view of the locking and ejecting device for a removable module in a portable computer according to a preferred embodiment of the invention is shown. The latch mechanism 210 is movably mounted on the first tunnel 260. The compression spring 214 coupling the latch mechanism 210 and a sidewall 20a of portable computer 20 provides a resistance to compression for positioning the latch mechanism 210. The remove mechanism 220 is movably mounted on the second tunnel 270. The extension spring 226 coupling the remove mechanism 220 and the portable computer 20 provides a resistance to extension for positioning the remove mechanism 220. One end of the extension spring 226 is fixed on a hook 228 of the remove mechanism, and the other end of the extension spring 226 is fixed on a hook 272 of the second tunnel 270, as shown in FIG. 2. The push arm 224 is slidably coupled to the internal bay 200 since the supports 202 can relatively slide in the sliding tracks 224a. Please refer to FIG. 4, the first knob 240 placed in the tunnel 260 and the second knob 250 placed in the tunnel 270 are disposed on the bottom surface 206 of the portable computer 20.

Figure 5:
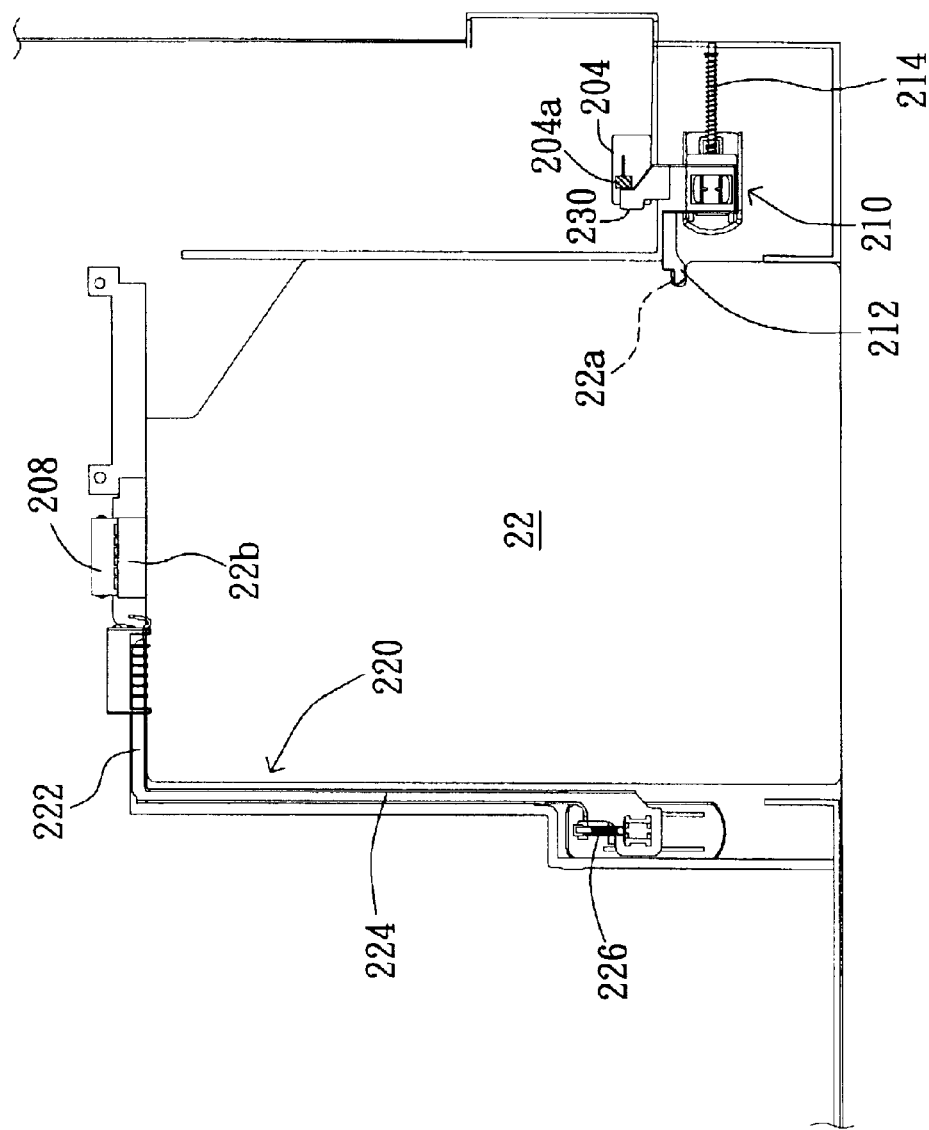
FIG. 5 is a top view of the locking and ejecting device showing the removable module is in the assembled position.

Referring to FIG. 5, a top view of the locking and ejecting device shows the removable module is in an assembled position. The removable module 22 is assembled in the portable computer with the plug 22b being inserted into the socket 208. One side of the removable module 22 is latched by inserting the latch bolt 212 into a notch 22a of the removable module 22. The compression spring 214 supports the latch mechanism 210 to lock the removable module 22 in an assembled position. The hot-plug controller 230 stays close to the switch 204 of the power unit 204 but keeps the power unit 204 switched on. The push rod 222 is parallel with and makes contact with the rear end of the removable module 22.

Figure 4:
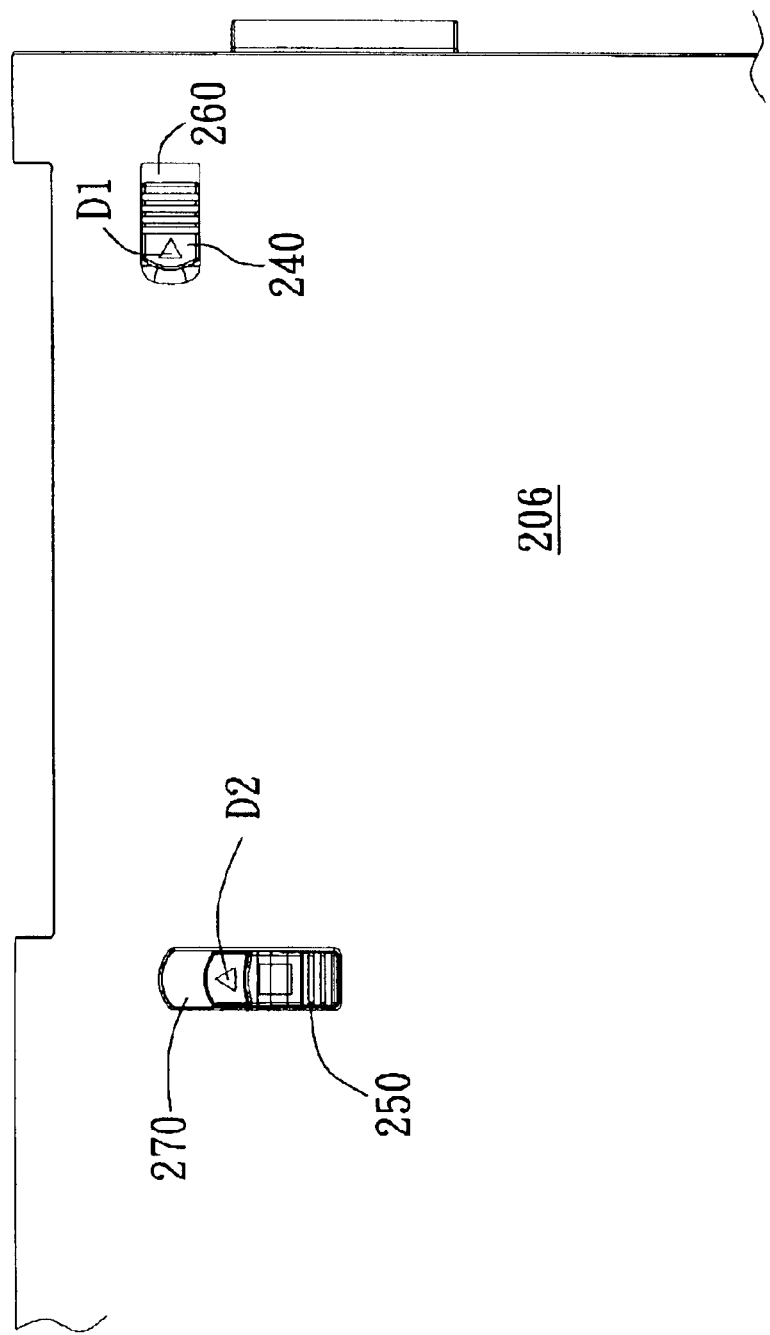
FIG. 4 shows module knobs disposed on the bottom surface of the portable computer according to a preferred embodiment of the invention.
Figure 6:
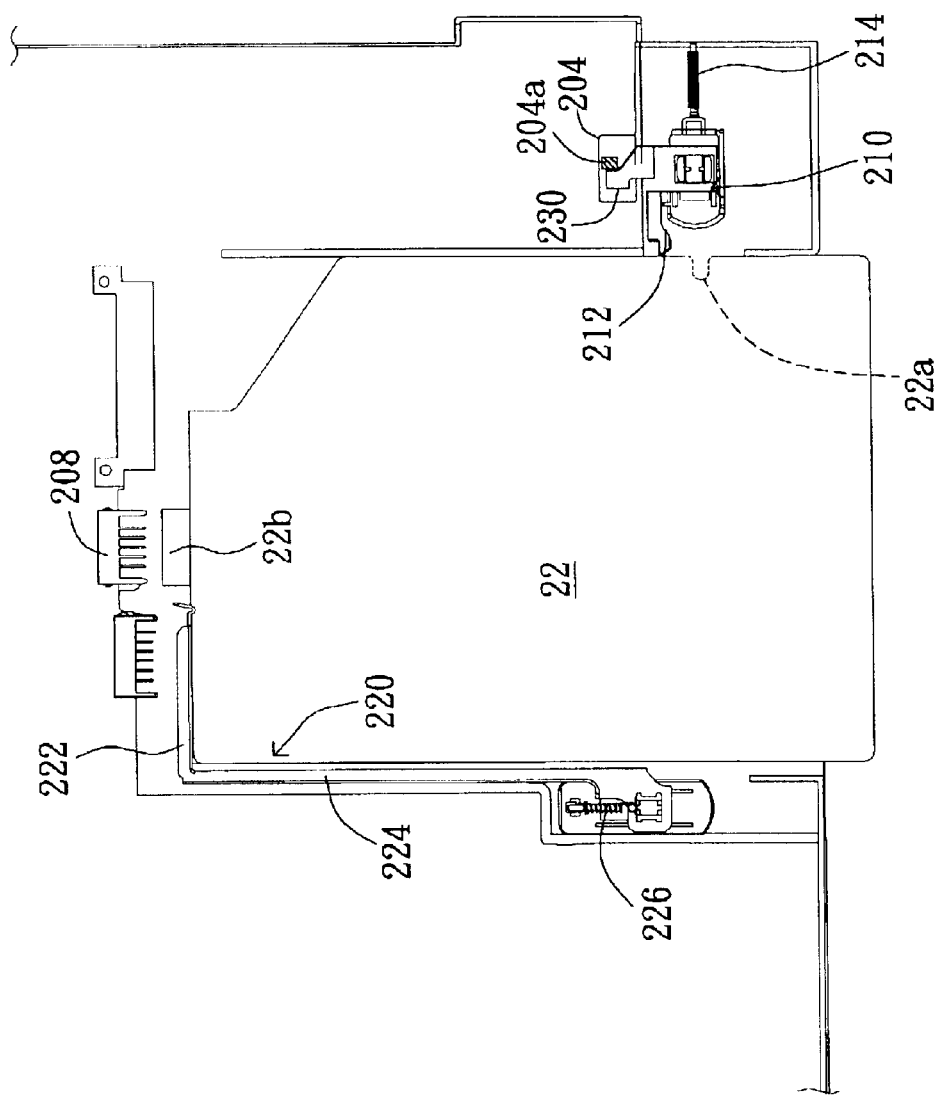
FIG. 6 is a top view of the locking and ejecting device showing the removable module is in the disassembled position.

Please refer to both FIG. 4 and FIG. 6. FIG. 6 is a top view of the locking and ejecting device shows the removable module is in the disassembled position. Before removing the removable module 22, the first knob 240 is pushed in the direction of the indicated arrow sign D1 for pressing the latch mechanism 210 to unlock the removable module 22 and to actuate the hot-plug controller 230. Therefore, releasing the latch bolt 212 from the notch 22a unlatches the removable module 22, and the hot-plug controller 230 pushes the switch 204a to switch off the power unit 204. The compression spring 214 is compressed as the first knob 240 is pushed. Subsequently, the second knob 250 is pushed in the direction of the indicated arrow sign D2 for pressing the remove mechanism 220. The push rod 222 carried by the push arm 224 pushes the removable module 22 outward, the plug 22b is pulled out form the socket 208, and the extension spring 226 is extended. The removable module 22 finally comes into a disassembled condition and can be removed out from the internal bay 200. Besides, the compression spring 214 provides a resistance to compression for homing the latch bolt 212 while the extension spring 226 provides a resistance to extension for homing the push rod 222.

The locking and ejecting device for a removable module in a portable computer according to the invention can secure the removable module for usage and easily remove the removable module for interchange. It prevents the removable module from getting stuck during the installation or removal of the removable module. Besides, the simple structure of the locking and ejecting device is designed under space and height constraints and is beneficial for the mass production and assembling. Moreover, the hot-plug function of the locking and ejecting device avoids unsafe removal of the removable module.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A locking and ejecting device for a removable module in a portable computer having an internal bay, comprising:
    a latch mechanism, coupled to the internal bay, for locking the removable module in an assembled position; and
    a remove mechanism for removing the removable module from the assembled position to a disassembled position after the latch mechanism unlocks the removable module, wherein the remove mechanism is an L-shaped component for holding the removable module, the remove mechanism comprising:
    a push rod, parallel with a rear end of the removable module, for pushing the removable module outward;
    a push arm, perpendicular to the push rod and slidably coupled to the internal bay, for carrying the push rod; and
    an extension spring, coupling the remove mechanism and the portable computer, capable of providing a resistance to extension for homing the push rod.

2. The locking and ejecting device according to claim 1, wherein the push arm has a sliding track so that a support formed on the internal bay relatively slides in the sliding track.

3. The locking and ejecting device according to claim 1, wherein the push arm has a support, which slides in a sliding track formed on the internal bay.

4. The locking and ejecting device according to claim 1, wherein the locking and ejecting device further comprises:
    a second knob disposed on the bottom surface of the portable computer, having a second protrusion projecting upward to engage with the remove mechanism, wherein the second knob is for pressing the remove mechanism to outward push the removable module.

5. The locking and ejecting device according to claim 4, wherein the locking and ejecting device further comprises:
    a second tunnel for placing a second knob inside, wherein the remove mechanism is movably mounted on the second tunnel.

6. The locking and ejecting device according to claim 5, wherein one end of the extension spring is fixed on the remove mechanism, and the other end of the extension spring is fixed on the second tunnel.

7. The locking and ejecting device according to claim 1, wherein the latch mechanism further comprises:
    a latch bolt, for latching a side of the removable module; and
    a compression spring, coupling the latch mechanism and the portable computer, capable of providing a resistance to compression for homing the latch bolt.

8. The locking and ejecting device according to claim 1, wherein the locking and ejecting device further comprises:
    a first knob disposed on a bottom surface of the portable computer, having a first protrusion projecting upward to engage with the latch mechanism, wherein the first knob is for pressing the latch mechanism to unlock the removable module.

9. The locking and ejecting device according to claim 1, wherein the locking and ejecting device further comprises:

a first tunnel for placing a first knob inside, wherein the latch mechanism is movably mounted on the first tunnel.

10. The locking and ejecting device according to claim 1, wherein the locking and ejecting device further comprises:

a hot-plug controller, formed on the latch mechanism, for switching off a power unit while the first knob presses the latch mechanism to unlock the removable module.

11. A locking and ejecting device for a removable module in a portable computer having a internal bay comprising:

a latch mechanism, coupled to the internal bay, for locking the removable module in an assembled position;

a remove mechanism, coupled to the internal bay, for removing the removable module from the assembled position to a disassembled position after the latch mechanism unlocks the removable module, wherein the remove mechanism is an L-shaped component for holding the removable module, the remove mechanism comprising:

a push rod, parallel with a rear end of the removable module, for pushing the removable module outward; and a push arm, perpendicular to the push rod and slidably coupled to the internal bay, for carrying the push rod;

a first knob, disposed on a bottom surface of the portable computer and engaged with the latch mechanism, wherein the first knob is for pressing the latch mechanism to unlock the removable module; and a second knob, disposed on the bottom surface of the portable computer and engaged with the remove mechanism, wherein the second knob is for pressing the remove mechanism to outward push the removable module.

12. The locking and ejecting device according to claim 11, wherein the rush arm has a sliding track so that a support formed on the internal bay relatively slides in the sliding track.

13. The locking and ejecting device according to claim 11, wherein the push arm has a support, which slides in a sliding track formed on the internal bay.

14. The locking and ejecting device according to claim 11, wherein the locking and ejecting device further comprises:

a hot-plug controller, formed on the latch mechanism, for switching off a power unit while the first knob presses the latch mechanism to unlock the removable module.

15. The locking and ejecting device according to claim 11, wherein the locking and ejecting device further comprises:

a compression spring, coupling the latch mechanism and the portable computer, capable of providing a resistance to compression for positioning the latch mechanism; and an extension spring, coupling the remove mechanism and the portable computer, capable of providing a resistance to extension for positioning the remove mechanism.

16. The locking and ejecting device according to claim 11, wherein the latch mechanism comprises:

a latch bolt, for latching a side of the removable module.

* * * * *